United States Patent
Chen et al.

(10) Patent No.: US 10,608,458 B2
(45) Date of Patent: Mar. 31, 2020

(54) CHARGING APPARATUS

(71) Applicant: Chicony Power Technology Co., Ltd., New Taipei (TW)

(72) Inventors: Jun-Han Chen, New Taipei (TW); Chien-Lung Liu, New Taipei (TW)

(73) Assignee: Chicony Power Technology, New Taipei (TW)

( * ) Notice: Subject to any disclaimer, the term of this patent is extended or adjusted under 35 U.S.C. 154(b) by 29 days.

(21) Appl. No.: 16/052,935

(22) Filed: Aug. 2, 2018

(65) Prior Publication Data

US 2019/0305575 A1 Oct. 3, 2019

(30) Foreign Application Priority Data

Apr. 3, 2018 (TW) .............................. 107112000 A

(51) Int. Cl.
| | |
|---|---|
| *H02J 7/00* | (2006.01) |
| *H02J 7/02* | (2016.01) |
| *H02J 50/80* | (2016.01) |
| *H02J 50/10* | (2016.01) |

(52) U.S. Cl.
CPC .............. *H02J 7/025* (2013.01); *H02J 50/10* (2016.02); *H02J 50/80* (2016.02)

(58) Field of Classification Search
USPC .......................................................... 320/108
See application file for complete search history.

(56) References Cited

U.S. PATENT DOCUMENTS

| | | | | |
|---|---|---|---|---|
| 8,129,942 B2* | 3/2012 | Park | ......... | H02J 7/025 320/108 |
| 8,471,525 B2* | 6/2013 | Kim | ......... | G01D 21/00 320/108 |
| 9,007,019 B2* | 4/2015 | Iijima | ......... | H02J 7/0052 320/108 |
| 2002/0057584 A1* | 5/2002 | Brockmann | ......... | H02J 7/025 363/98 |
| 2008/0197802 A1* | 8/2008 | Onishi | ......... | H02J 5/005 320/106 |
| 2012/0212068 A1* | 8/2012 | Urano | ......... | H02J 5/005 307/104 |
| 2014/0285030 A1* | 9/2014 | Nakamura | ......... | H02J 50/90 307/104 |
| 2015/0048752 A1* | 2/2015 | Van Den Brink | ......... | H02J 5/005 315/246 |
| 2015/0170830 A1* | 6/2015 | Miyamoto | ......... | H02J 5/005 307/104 |
| 2015/0180265 A1* | 6/2015 | Chiang | ......... | H02J 50/10 320/108 |

* cited by examiner

*Primary Examiner* — Samuel Berhanu
(74) *Attorney, Agent, or Firm* — Chung-Ming Shih; HDLS IPR Services

(57) ABSTRACT

A charging apparatus includes a power requirement unit and a power supply unit. The power requirement unit has a first sensing module and a first control module. The first sensing module senses an electric parameter value of a load. The first control module receives the electric parameter value. The power supply unit has a second control module and a power switching module. The second control module receives the electric parameter value to switch the power switching module according to an accumulated difference value produced by the electric parameter value and a target electric parameter value, thereby controlling the electric parameter value to be equal to the target electric parameter value.

10 Claims, 7 Drawing Sheets

CHARGING APPARATUS

BACKGROUND OF THE INVENTION

Field of the Invention

The present invention relates to a charging apparatus, more particularly to an inductance-coupling charging apparatus.

Description of Related Art

The switching frequency of power conveter is continually increased as the compactness of power conveter is more demanding, this also boosts the developments of power supply industry. The digital chip is used as the controller of power control and power management, and has great impact to the operation performance of the power conveter with high switching frequency.

Taking the preciseness demand for high switching frequency as example, the switching frequency generated by the digital chip cannot meet the required preciseness and accuracy for voltage control or current control of the power converter if the system frequency of the digital chip is not enough. For example, if the digital chip has system frequency of 60 MHz, the frequency period of 320 and the frequency period difference of 2, then the switching frequency difference is 1.165 KHz, namely, 60 MHz/320-60 MHz/322=1.2 KHz. Therefore it is hard to achieve power control application with high preciseness. The cost of device will be uneconomically high if the system frequency of the digital chip is increased for higher preciseness.

FIG. 7 shows the relationship between the frequency and voltage of an existing digital chip. The abscissa shows the switching frequency Fsw and the ordinate shows the output voltage Vout (or the corresponding voltage gain). As mentioned above, the low switching frequency $f_L$ is calculated to be 186.3 KHz and the high switching frequency $f_H$ is calculated to be 187.5 KHz. The power supply can provide a first output voltage V1 if the power supply performs switching operations at low switching frequency $f_L$; the power supply can provide a second output voltage V2 if the power supply performs switching operations at high switching frequency $f_H$. If the digital chip with low system frequency is used for controlling the output voltage (or output current) of the power supply, the performance thereof is limited by the frequency difference of the two adjacent switching frequencies and output control with high preciseness is hard to achieve.

SUMMARY OF THE INVENTION

It is an object of the present invention to provide a charging apparatus to solve the problem of difficulty in achieving high preciseness for output control, which is due to the insufficient system frequency of digital chip.

Accordingly, the present invention provides a charging apparatus having a target electric parameter value and supplying electric power to a load. The charging apparatus comprises a power requirement unit and a power supply unit. The power requirement unit comprises a first sensing module for detecting an electric parameter value of the load, and a first control module for receiving the electric parameter value. The power supply unit comprises a second control module receiving the electric parameter value and providing a first frequency, a second frequency and a frequency difference; and a power switching module. The second control module is configured to calculate an accumulated difference value based on the electric parameter value and the target electric parameter value, the second control module is configured to switch the power switching module at the first frequency with times of a first count and to switch the power switching module at the second frequency with times of a second count. When the accumulated difference value is larger than an adjustment upper bound, the second control module is configured to use the second frequency as a new first frequency and to use the second frequency subtracting the frequency difference as a new second frequency. When the accumulated difference value is smaller than an adjustment lower bound, the second control module is configured to use the first frequency as a new second frequency and to use the first frequency plus the frequency difference as a new first frequency; whereby the electric parameter value is adjusted to the target electric parameter value.

According to an embodiment, the first control module is configured to digitalize the electric parameter value, the second control module provides a digital target electric parameter value by digitalizing the target electric parameter value. The second control module comprises an operation unit configured to receive the target electric parameter value and the electric parameter value and to perform calculation on the target electric parameter value and the electric parameter value to generate an electric parameter difference value; and an accumulator receiving the electric parameter difference value and accumulating the electric parameter difference value to provide the accumulated difference value with P bits.

According to another embodiment, the second control module is configured to fetch M most significant bits from the P bits data to form an M bit data, and to adjust the first count and the second count based on the M bit data. A sum of the first count and the second count is equal to a maximal value represented by the M bit data.

According to still another embodiment, the second control module is configured to determine that the accumulated difference value is larger than the adjustment upper bound when the digital target electric parameter value is larger than the digital electric parameter value and the M bit data has carry operation.

According to still another embodiment, the second control module is configured to determine that the accumulated difference value is smaller than the adjustment lower bound when the digital target electric parameter value is smaller than the digital electric parameter value and the M bit data has borrow operation.

According to still another embodiment wherein the second count is equal to a decimal value corresponding to the M bit data.

According to still another embodiment, the charging apparatus comprises a communication module. The communication module receives the electric parameter value provided by the first control module and sends the electric parameter value to the second control module.

According to still another embodiment, the power supply unit further comprises a touch-control switch coupled to the second control module. The touch-control switch is configured to trigger the second control module to control the power switching module when the touch-control switch receives a touch signal.

According to still another embodiment, the charging apparatus comprises an inductance coupling unit coupled between the power supply unit and the power requirement unit and sending an electric power of the power supply unit to the power requirement unit. The communication module has Bluetooth communication function to provide wireless communication between the first control module and the second control module.

According to still another embodiment, the charging apparatus comprises a power conversion unit electrically connected between the power supply unit and the power requirement unit and sending an electric power of the power supply unit to the power requirement unit. The communication module provides wired communication between the first control module and the second control module.

By the charging apparatus of the present invention, the power switching module can be switched with frequency division to achieve output control with high preciseness.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

The detailed description of the present invention will be described in detail below with reference to the attached drawings.

Figure 1:
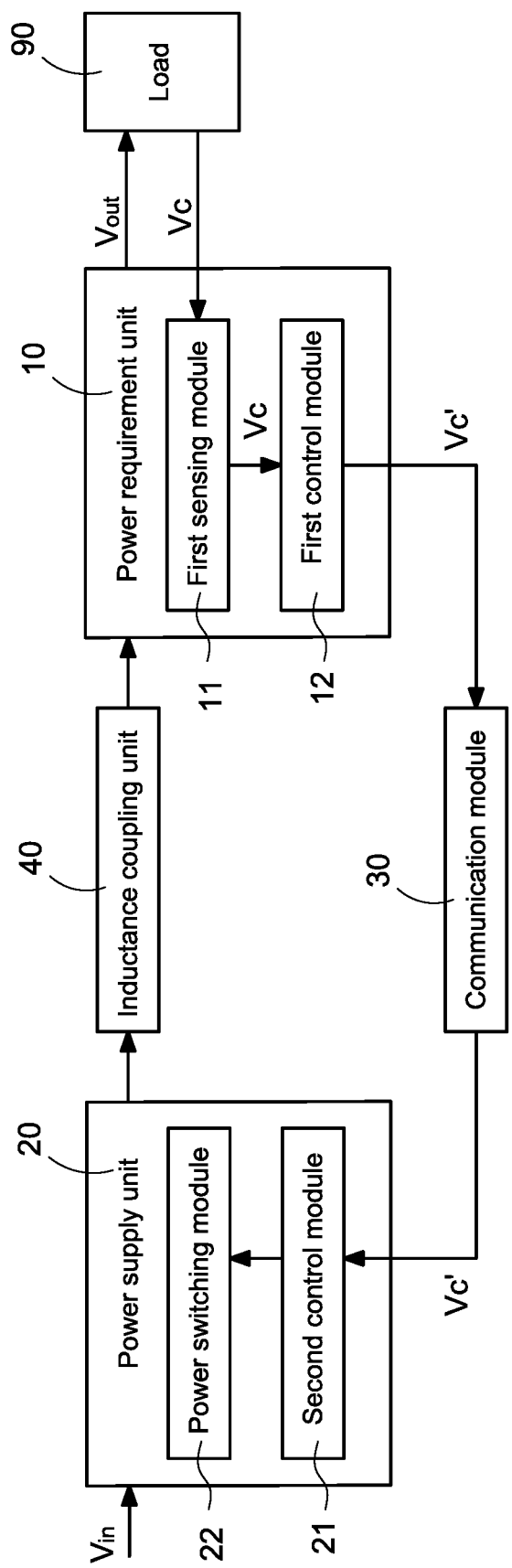
FIG. 1 shows the circuit block diagram of the charging apparatus according to the first embodiment of the present invention.

FIG. 1 shows the circuit block diagram of the charging apparatus according to the first embodiment of the present invention. The charging apparatus provides electric power to the load 90 with the target electric parameter value. The load 90 may be the portable device (such as mobile phone or panel computer) with rechargeable battery or rechargeable electric appliance. The above-mentioned target electric parameter value is the target voltage parameter value or the target current parameter value. Therefore, the charging apparatus of the present invention provides electric power to the load 90 with the target voltage parameter value or the target current parameter value. For the convenience of description, the target electric parameter value is exemplified with target voltage parameter value hereinafter.

The charging apparatus mainly comprises a power requirement unit 10 and a power supply unit 20. The power requirement unit 10 provides output voltage Vout to charge the load 90 (or to supply power to the load 90), and the power requirement unit 10 mainly comprises a first sensing module 11 and a first control module 12. The first sensing module 11 senses the electric parameter value Vc of the load 90, where the electric parameter value is mainly referred to the voltage parameter value or the current parameter value. The charging apparatus supplies electric power to the load 90 with the target voltage parameter value, and therefore the electric parameter value is exemplified with voltage parameter value. Namely, the first sensing module 11 senses the voltage parameter value for the load 90. The first control module 12 is coupled to the first sensing module 11 and receives the electric parameter value Vc sensed by the first sensing module 11.

The power supply unit 20 mainly comprises a second control module 21 and a power switching module 22. The power supply unit 20 receives the input voltage Vin to get the required power. The second control module 21 receives the electric parameter value Vc. More particularly, the second control module 21 of the power supply unit 20 receives the electric parameter value Vc sent by the first sensing module 11 of the power requirement unit 10. Moreover, the second control module 21 provides the first frequency $f_1$, the second frequency $f_2$ and the frequency difference, which will be detailed later.

In this embodiment, the charging apparatus further comprises a communication module 30. The communication module 30 connects with the first sensing module 11 and the second control module 21 through wired or wireless communication. The electric parameter value Vc is sent from the first sensing module 11 to the second control module 21 through the communication module 30 by wired or wireless communication. The communication module 30 has Bluetooth communication function to provide wireless communication between the first control module 12 and the second control module 21. However, this specific example is not limitation to the communication module 30 and the communication module 30 can adopt other wireless communication protocol.

In this embodiment, the first control module 12 may further digitalize the electric parameter value Vc into digital electric parameter value Vc'. Therefore, the communication module 30 further sends the digital electric parameter value Vc' from the first sensing module 11 to the second control module 21 through wired or wireless communication.

In this embodiment, the charging apparatus further comprises an inductance coupling unit 40, which is coupled between the power supply unit 20 and the power requirement unit 10 and supplies the electric power of the power supply unit 20 to the power requirement unit 10, thus further charges the load 90 (or supplies power to the load 90). The inductance coupling unit 40 may be a wireless charger, which may also be referred to induction charger or non-contact induction charger. The inductance coupling unit 40 supplies electric power wirelessly to the power-requiring equipment or device through near field induction (namely, inductance coupling). When the charging apparatus adopts the inductance coupling unit 40, the communication module 30 provides wireless communication between the first control module 12 and the second control module 21, for example, provides Bluetooth communication between the first control module 12 and the second control module 21.

Figure 2:
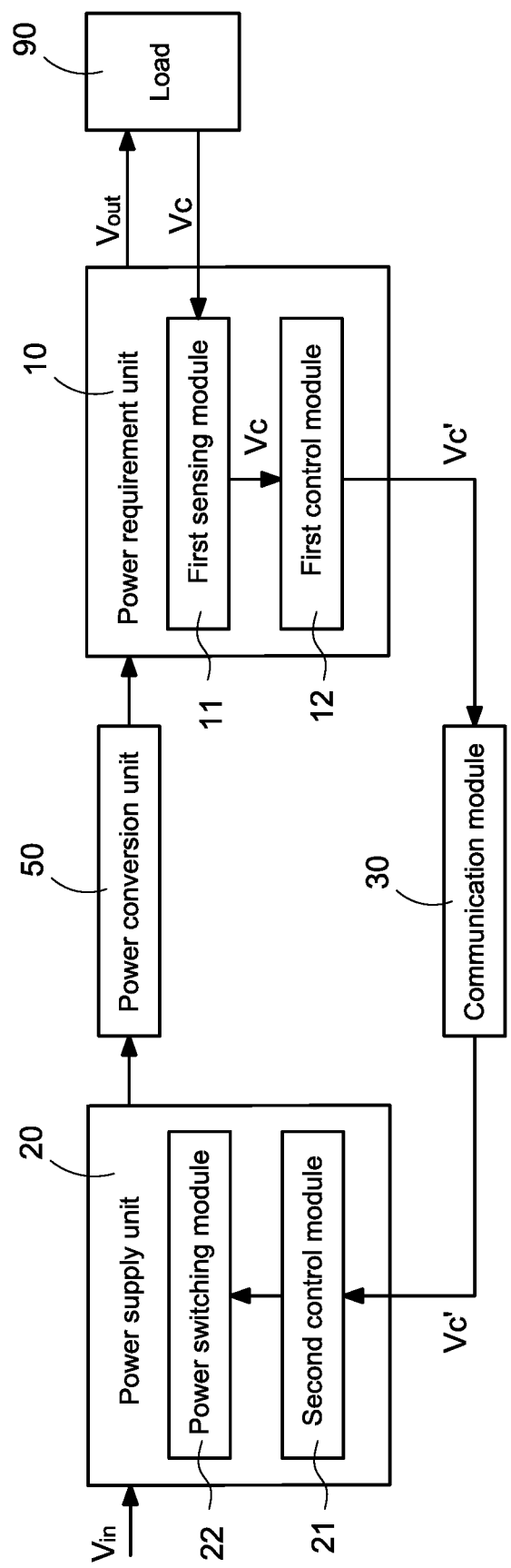
FIG. 2 shows the circuit block diagram of the charging apparatus according to the second embodiment of the present invention.

FIG. 2 shows the circuit block diagram of the charging apparatus according to the second embodiment of the present invention. The second embodiment is different with the first embodiment shown in FIG. 1 mainly in that the inductance coupling unit 40 for supplying the electric power of the power supply unit 20 to the power requirement unit 10 is replaced by a power conversion unit 50. The power conversion unit 50 is coupled between the power supply unit 20 and the power requirement unit 10 and supplies the electric power of the power supply unit 20 to the power requirement unit 10, thus further charges the load 90 (or supplies power to the load 90). The power conversion unit 50 may be LLC resonance converter or other types of converters. When the charging apparatus adopts the power conversion unit 50, the communication module 30 provides wired communication between the first control module 12 and the second control module 21.

Figure 3:
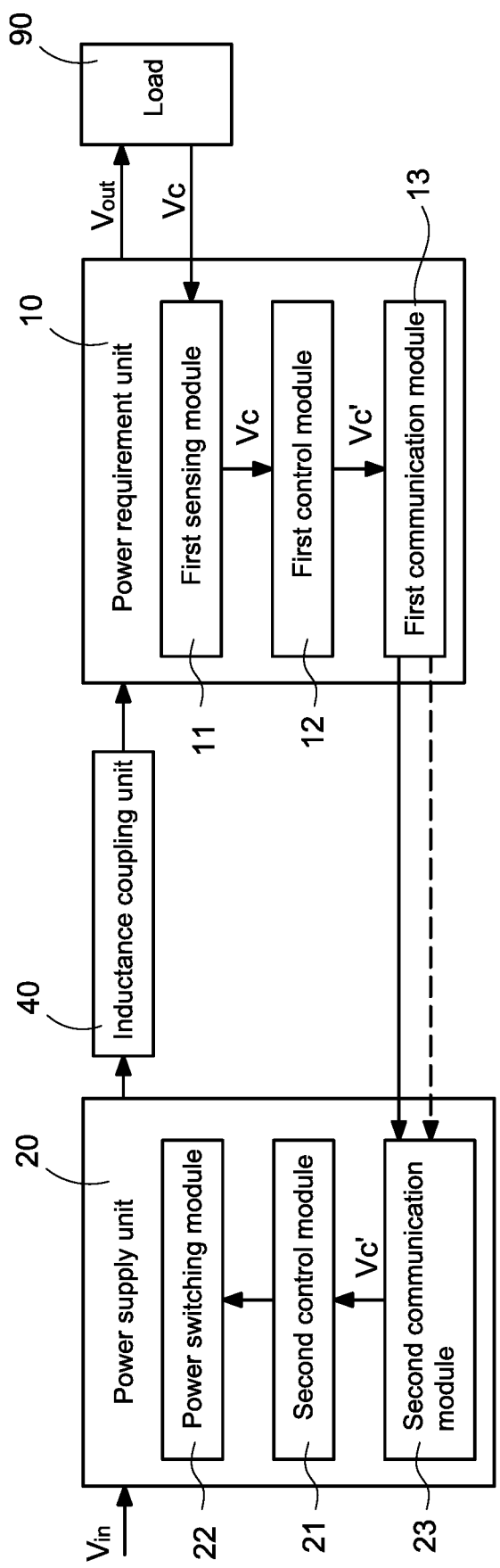
FIG. 3 shows the circuit block diagram of the charging apparatus according to the third embodiment of the present invention.

FIG. 3 shows the circuit block diagram of the charging apparatus according to the third embodiment of the present invention. The third embodiment is different with the first embodiment shown in FIG. 1 mainly in that the communication module 30 for sending the electric parameter value Vc (sending from the first control module 12 to the second control module 21) is replaced by communication module respectively provided by the power requirement unit 10 and the power supply unit 20. In this embodiment, the power requirement unit 10 further comprises a first communication module 13 and the power supply unit 20 further comprises a second communication module 23. Similarly, the first communication module 13 and the second communication module 23 may send the electric parameter value Vc (or the digital electric parameter value Vc') from the first sensing module 11 to the second control module 21 through wired or wireless communication.

The solid line shown in FIG. 3 and between the first communication module 13 and the second communication module 23 indicates the wired communication between the first communication module 13 and the second communication module 23; while the dashed line shown in FIG. 3 and between the first communication module 13 and the second communication module 23 indicates the wireless communication between the first communication module 13 and the second communication module 23. While both solid line and dashed line are shown in FIG. 3, it does not mean that the first communication module 13 and the second communication module 23 adopt both wired and wireless communication. At least one of the wired and wireless communication can be employed to send the electric parameter value Vc (or the digital electric parameter value Vc') from the first sensing module 11 to the second control module 21. More particularly, when the charging apparatus adopts the inductance coupling unit 40, the first communication module 13 and the second communication module 23 may adopt wireless communication. When the charging apparatus adopts the power conversion unit 50, the first communication module 13 and the second communication module 23 may adopt wired communication.

Figure 4:
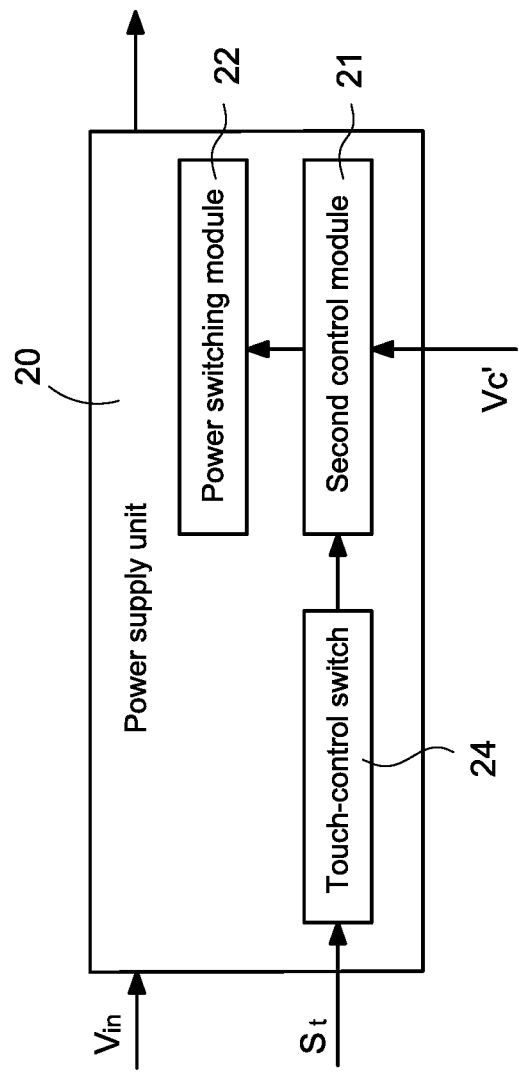
FIG. 4 shows the circuit block diagram of the power supply unit 20 of the present invention, which has touch-control switch.

FIG. 4 shows the circuit block diagram of the power supply unit 20 of the present invention, which has touch-control switch. In this embodiment, the power supply unit 20 further comprises a touch-control switch 24 coupled to the second control module 21. Upon receiving the touch signal St, the touch-control switch 24 triggers the second control module 21 to control the power switching module 22. For example, when the object to be charged (such as electric motorbike or electric bicycle, but this is not limitation to the present invention) touches or presses against the touch-control switch 24 during the alignment for charging operation, equivalently the touch-control switch 24 receives the touch signal St. The second control module 21 controls the power switching module 22 to charge the object to be charged.

Figure 5:
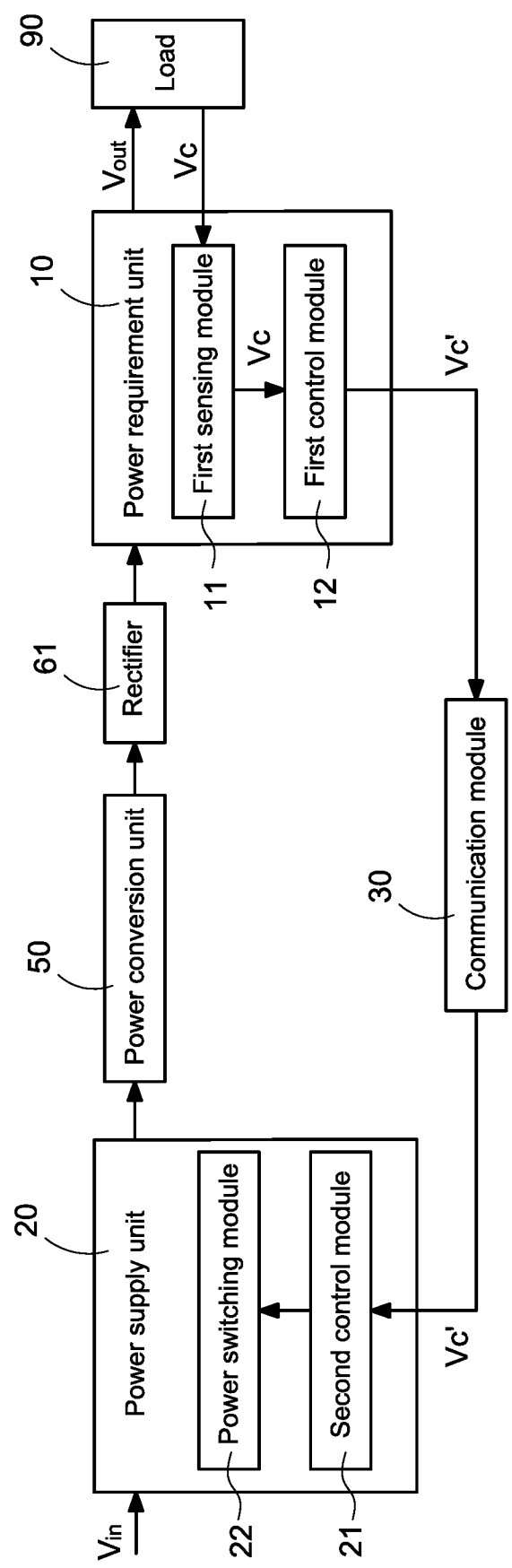
FIG. 5 shows the circuit block diagram of the charging apparatus according to the fourth embodiment of the present invention.

FIG. 5 shows the circuit block diagram of the charging apparatus according to the fourth embodiment of the present invention. The charging apparatus further comprises a rectifier 61 coupled between the power conversion unit 50 and the power requirement unit 10. The rectifier 61 full-wave rectifies the output of the power conversion unit 50 and supplies the rectified electric power to the power requirement unit 10. The rectifier 61 may be diode bridge full-wave rectifier or center tapped full-wave rectifier. However, the scope of the present invention is not limited by above example and the e rectifier 61 may be any circuit capable of full-wave rectification.

The charging apparatus according to present invention may perform adaptive frequency-division to control the digital electric parameter value Vc' (or the electric parameter value Vc) to be equal to the digital target electric parameter value Vt' (or the target electric parameter value) to precisely supply the load 90 with required charging voltage or charging current. More particularly, the second control module 21 adjusts the switching times of the power switching module 22 switched at the first frequency $f_1$ to be first count P1 and the switching times of the power switching module 22 switched at the second frequency $f_2$ to be second count P2 based on the accumulated difference value $\Sigma\Delta V$ produced according to the digital electric parameter value Vc' and the digital target electric parameter value Vt'.

The below description is based on the scenario of increasing the digital electric parameter value Vc' of the charging apparatus to be the digital target electric parameter value Vt'. The accumulated difference value $\Sigma\Delta V$ is positive because the digital electric parameter value Vc' of the charging apparatus is smaller than the digital target electric parameter value Vt'. Moreover, the accumulated difference value $\Sigma\Delta V$ gradually increases during the adjustment (increase) of the digital electric parameter value Vc'. When the accumulated difference value $\Sigma\Delta V$ is larger than an adjustment upper bound, the second control module 21 uses the second frequency $f_2$ as the new first frequency $f_1$, and uses the second frequency $f_2$ subtracting the frequency difference as the new second frequency $f_2$ and then controls the digital electric parameter value Vc' to be equal to the digital target electric parameter value Vt'.

The below description is based on the scenario of decreasing the digital electric parameter value Vc' of the charging apparatus to be the digital target electric parameter value Vt'. The accumulated difference value $\Sigma\Delta V$ gradually decreases because the digital electric parameter value Vc' of the charging apparatus is larger than the digital target electric parameter value Vt'. When the accumulated difference value $\Sigma\Delta V$ is smaller than an adjustment lower bound, the second control module 21 uses the first frequency $f_1$ as the new second frequency $f_2$, and uses the first frequency $f_1$ plus the frequency difference as the new first frequency $f_1$ and then controls the digital electric parameter value Vc' to be equal to the digital target electric parameter value Vt'.

Figure 6:
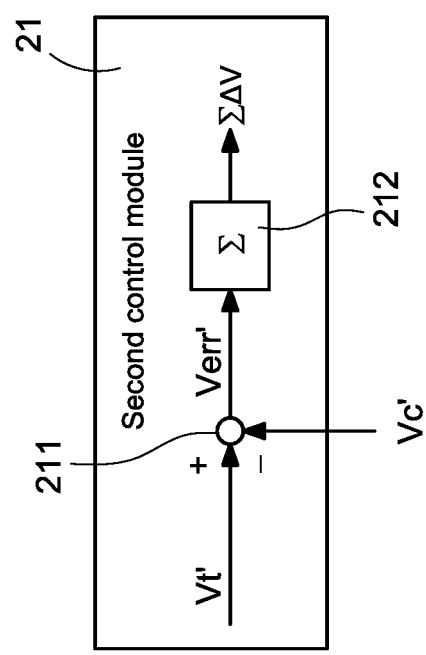
FIG. 6 shows the circuit block diagram of the second control module 21 of the present invention.
Figure 7:
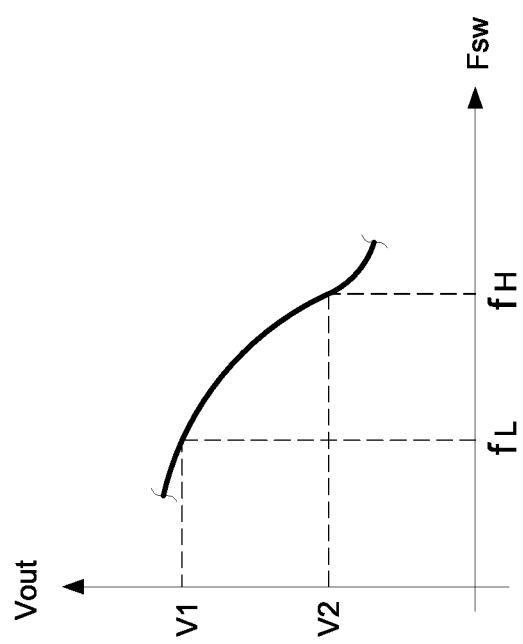
FIG. 7 shows the relationship between the frequency and voltage of an existing digital chip.

FIG. 6 shows the circuit block diagram of the second control module 21 of the present invention. The second control module 21 provides the target electric parameter value Vt or the digital target electric parameter value Vt'. The second control module 21 comprises an operation unit 211 and an accumulator 212. Taking digital processing as example, the operation unit 211 receives the digital target electric parameter value Vt' and the digital electric parameter value Vc', and performs calculation on the digital target electric parameter value Vt' and the digital electric parameter value Vc' to obtain the digital electric parameter difference value Verr'. In this embodiment, the digital electric parameter difference value Verr' is the result of the digital target electric parameter value Vt' subtracting the digital electric parameter value Vc'. The accumulator 212 receives the digital electric parameter difference value Verr' and accumulates the digital electric parameter difference value Verr' to obtain the accumulated difference value $\Sigma\Delta V$. The digital electric parameter difference value Verr' is positive when the digital target electric parameter value Vt' is larger than the digital electric parameter value Vc'; therefore, the accumulated difference value $\Sigma\Delta V$ (which may be the digital accumulated difference value) gradually increases. On the contrary, the digital electric parameter difference value Verr' is negative when the digital target electric parameter value Vt' is smaller than the digital electric parameter value Vc'; therefore, the accumulated difference value $\Sigma\Delta V$ (which may be the digital accumulated difference value) gradually decreases. In this embodiment, the accumulated difference value $\Sigma\Delta V$ has P bits. P is 16 when the accumulated difference value $\Sigma\Delta V$ is data of 16 bits and the accumulated difference value $\Sigma\Delta V$ has data format $b_{15}b_{14}b_{13}b_{12} \ldots b_1b_0$. P is 8 when the accumulated difference value $\Sigma\Delta V$ is data of 8 bits and the accumulated difference value $\Sigma\Delta V$ has data format $b_7b_6b_5b_4 \ldots b_1b_0$ and so on.

Moreover, the second control module 21 fetches the M most significant bits out of the P-bit data $b_{15}b_{14}b_{13}b_{12} \ldots b_1b_0$ as the M bit data $b_{15}b_{14}b_{13}b_{12}$ and then adjust the first count P1 and the second count P2 based on the M bit data $b_{15}b_{14}b_{13}b_{12}$, where the second count P2 is equal to the decimal value corresponding to the M bit data $b_{15}b_{14}b_{13}b_{12}$ and detailed description will be made later. In this embodiment, P is 16 and then M=4 means that the 4 most significant bits out of the P-bit data $b_{15}b_{14}b_{13}b_{12} \ldots b_1b_0$ are fetched. If P is 16 and M=8, it means that the 8 most significant bits out of the P-bit data $b_{15}b_{14}b_{13}b_{12} \ldots b_1b_0$ are fetched and so on. Moreover, the sum of the first count P1 and the second count P2 is equal to the decimal value corresponding to the maximal value represented by the M bit data, namely, the sum of the first count P1 and the second count P2 is equal to 16 when M=4.

In case that the digital target electric parameter value Vt' is larger than the digital electric parameter value Vc', the second control module 21 determines that the accumulated difference value $\Sigma\Delta V$ is larger than the adjustment upper bound when the M bit data $b_{15}b_{14}b_{13}b_{12}$ has carry operation (because the accumulated difference value $\Sigma\Delta V$ gradually increases). The second control module 21 then controls the magnitudes of the first frequency $f_1$ and the second frequency $f_2$. In case that the digital target electric parameter value Vt' is smaller than the digital electric parameter value Vc', the second control module 21 determines that the accumulated difference value $\Sigma\Delta V$ is smaller than the adjustment lower bound when the M bit data $b_{is}b_{14}b_{13}b_{12}$ has borrow operation (because the accumulated difference value $\Sigma\Delta V$ gradually decreases). The second control module 21 then controls the magnitudes of the first frequency $f_1$ and the second frequency $f_2$, which will be detailed later.

The adaptive frequency-division control of the charging apparatus according to present invention will be described with numeric example. It is assumed that the first frequency $f_1$ is 200 KHz, the second frequency $f_2$ is 198 KHz, the frequency difference is 2 KHz, P is 16 bits, and M is 4 bits. Moreover, in this example, the electric parameter value Vc outputted by the charging apparatus (for example, 46 volts) is adjusted to increase to the target electric parameter value Vt (for example, 48 volts).

Moreover, provided that the initial value of the P-bit data $b_{15}b_{14}b_{13}b_{12} \ldots b_1b_0$ is zero, namely, the P-bit data $b_{15}b_{14}b_{13}b_{12} \ldots b_1b_0$ for the accumulated difference value $\Sigma\Delta V$ has following contents:

| X | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |

At this time, the 4 most significant bits of the P-bit data $b_{15}b_{14}b_{13}b_{12} \ldots b_1b_0$ (P=16) are the 4 (M=4) bit data ($b_{15}b_{14}b_{13}b_{12}$) with content of 0000, and the symbol X in above table indicates the carry bit for the P-bit data, namely, the carry bit for the M-bit data.

Because the digital electric parameter value Vc' is smaller than the digital target electric parameter value Vt', the digital electric parameter difference value Verr' calculated by the operation unit 211 will be accumulated by the accumulator 212 continuously. The accumulated difference value $\Sigma\Delta V$ accordingly increases (because the digital target electric parameter value Vt' is larger than the digital electric parameter value Vc', namely, Vt'-Vc'>0) and the value of the P-bit data also increases. Provided that the P-bit data for the accumulated difference value $\Sigma\Delta V$ has following contents at a certain time point:

| X | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ |
|---|---|---|---|---|---|---|---|---|---|---|---|---|---|---|---|---|
| 0 | 1 | 0 | 1 | 0 | 0 | 0 | 1 | 1 | 1 | 0 | 1 | 0 | 0 | 1 | 0 | 1 |

At this time point, the 4 most significant bits ($b_{15}b_{14}b_{13}b_{12}$) of the 16-bit data are 1010 and has decimal value of 10. At this time, the second control module 21 switches the power switching module 22 with times of the second count P2 (10 times) at low frequency, namely the second frequency f $f_2$ of 198 KHz. The sum of the first count P1 and the second count P2 is equal to the decimal value corresponding to the maximal value 1111 represented by the 4 bit data, namely, the sum is 16 in decimal value. The second control module 21 switches the power switching module 22 with times of the first count P1 (6 times) at high frequency, namely the first frequency $f_1$ of 200 KHz. Moreover, the accumulated difference value $\Sigma\Delta V$ continuously increases. As long as the 4 most significant bits of the 16-bit data has not changed during the accumulation of the accumulated difference value $\Sigma\Delta V$, the second control module 21 switches the power switching module 22 with 10 times at the second frequency $f_2$ (198 KHz) and switches the power switching module 22 with 6 times at the first frequency $f_1$ (200 KHz).

Once the 4 most significant bits of the 16-bit data changes from 1010 to 1011 (11 in decimal value) during the accumulation of the accumulated difference value ΣΔV, the second control module 21 switches the power switching module 22 with 11 times at the second frequency $f_2$ (198 KHz) and switches the power switching module 22 with 5 times at the first frequency $f_1$ (200 KHz). During the operation of the charging apparatus, the accumulated difference value ΣΔV continuously increases as long as digital electric parameter value Vc' is smaller than the digital target electric parameter value Vt'. As the value corresponding to the 4 most significant bits of the 16-bit data increases, the times for switching the power switching module 22 at low frequency, namely the second frequency $f_2$ of 198 KHz, is increased for the second control module 21, the times for switching the power switching module 22 at high frequency, namely the first frequency $f_1$ of 200 KHz, is decreased. When the 4 most significant bits of the 16-bit data reach the maximum, namely, 1111, the second count P2 is 16 and the first count P1 is 0. At this time, the second control module 21 switches the power switching module 22 only at the low frequency, namely, at the second frequency $f_2$ (198 KHz).

Moreover, carry operation occurs when the 4 most significant bits of the 16-bit data further increases from 1111, namely, the carry bit X changes from 0 to 1. The current example is exemplified with that the electric parameter value Vc outputted by the charging apparatus increases to the target electric parameter value Vt. When the carry bit X has changed, the second control module 21 determines that the accumulated difference value ΣΔV exceeds the adjustment upper bound. At this time, the second control module 21 uses the original second frequency $f_2$ (198 KHz) as the new first frequency $f_1$, namely, the first frequency $f_1$ is changed from 200 KHz to 198 KHz. The second control module 21 uses the original second frequency $f_2$ subtracting the frequency difference (namely, 2 KHz) as the new second frequency $f_2$, namely, the second frequency $f_2$ is changed from 198 KHz to 196 KHz.

At the moment when the carry bit X changes (namely, from 0 to 1), the P-bit data changes from $(1111111111111111)_2$ to $(0000000000000000)_2$. Therefore, the 4 most significant bits of the 16-bit data change from 1111 to 0000. The first frequency $f_1$ and the second frequency $f_2$ are correspondingly decreased and the frequency-division operation is repeated; namely, the second count P2 and the first count P1 for switching the power switching module 22 are adjusted as the accumulated difference value ΣΔV continuously increases. Finally, the digital electric parameter value Vc' (for example, voltage value) of the charging apparatus is adjusted to increase to the digital target electric parameter value Vt', namely, the output voltage Vout of the charging apparatus is adjusted from 46 volts to 48 volts gradually.

Moreover, in another example, the electric parameter value Vc outputted by the charging apparatus (for example, 50 volts) decreases to the target electric parameter value Vt (for example, 48 volts). With reference also to the previous example, the first frequency $f_1$ (such as 200 KHz) is high frequency with respect to the second frequency $f_2$ (such as 198 KHz). Namely, the second control module 21 switches the power switching module 22 at low frequency of the second frequency $f_2$ and also at the high frequency of the first frequency $f_1$.

Because the digital electric parameter value Vc' is larger than the digital target electric parameter value Vt', the digital electric parameter difference value Verr' calculated by the operation unit 211 will be inverse accumulated by the accumulator 212 and continuously decrease the accumulated difference value ΣΔV. The accumulated difference value ΣΔV accordingly decreases (because the digital target electric parameter value Vt' is smaller than the digital electric parameter value Vc', namely, Vt'-Vc'<0) and the value of the P-bit data also decreases. Provided that the P-bit data for the accumulated difference value ΣΔV has following contents at a certain time point:

| Y | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ |
|---|---|---|---|---|---|---|---|---|---|---|---|---|---|---|---|---|
| 1 | 1 | 0 | 1 | 0 | 0 | 0 | 1 | 1 | 1 | 0 | 1 | 0 | 0 | 1 | 0 | 1 |

At this time, the second control module 21 switches the power switching module 22 with 10 times at low frequency, namely the second frequency $f_2$ of 198 KHz; and switches the power switching module 22 with 6 times at high frequency, namely the first frequency f1 of 200 KHz.

Once the 4 most significant bits of the 16-bit data changes from 1010 to 1001 (9 in decimal value) during the decrease of the accumulated difference value ΣΔV, the second control module 21 switches the power switching module 22 with 9 times at the second frequency $f_2$ (198 KHz) and switches the power switching module 22 with 7 times at the first frequency $f_1$ (200 KHz). As the value corresponding to the 4 most significant bits of the 16-bit data decreases, the times for switching the power switching module 22 at low frequency, namely the second frequency $f_2$ of 198 KHz, is decreased gradually, the times for switching the power switching module 22 at high frequency, namely the first frequency $f_1$ of 200 KHz, is increased gradually. When the 4 most significant bits of the 16-bit data reach the minimum, namely, 0000, the second count P2 is 0 and the first count P1 is 16. At this time, the second control module 21 switches the power switching module 22 only at the high frequency, namely, at the first frequency $f_1$ (200 KHz).

Moreover, borrow operation occurs when the 4 most significant bits of the 16-bit data further decreases from 0000, namely, the borrow bit Y changes from 1 to 0. The current example is exemplified with that the electric parameter value Vc outputted by the charging apparatus decreases to the target electric parameter value Vt. When the borrow bit Y has changed, the second control module 21 determines that the accumulated difference value ΣΔV is lower than the adjustment lower bound. At this time, the second control module 21 uses the original first frequency $f_1$ (200 KHz) as the new second frequency $f_2$, namely, the second frequency $f_2$ is changed from 198 KHz to 200 KHz. The second control module 21 uses the original first frequency $f_1$ plus the frequency difference (namely, 2 KHz) as the new first frequency $f_1$, namely, the first frequency $f_1$ is changed from 200 KHz to 202 KHz.

At the moment when the borrow bit Y changes (namely, from 1 to 0), the P-bit data changes from $(0000000000000000)_2$ to $(1111111111111111)_2$. Therefore, the 4 most significant bits of the 16-bit data change from 0000 to 1111. The first frequency $f_1$ and the second frequency $f_2$ are correspondingly increased and the frequency-division operation is repeated, namely; the second count P2 and the first count P1 for switching the power switching module 22 are adjusted as the accumulated difference value $\Sigma\Delta V$ continuously decreases. Finally, the digital electric parameter value Vc' (for example, voltage value) of the charging apparatus is adjusted to decrease to the digital target electric parameter value Vt', namely, the output voltage Vout of the charging apparatus is adjusted from 50 volts to 48 volts.

Moreover, the number M of the most significant bits (MSB) fetched from the P-bit data is not limited to 4. Other value of M can be used (for example 6 for more MSB or 2 for less MSB) and the first frequency $f_1$ and the second frequency $f_2$ can be flexibly adjusted to achieve both fast response and control accuracy.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A charging apparatus providing a target electric parameter value and supplying electric power to a load, the charging apparatus comprising:
    a power requirement unit and a power supply unit;
    wherein the power requirement unit comprises:
    a first sensing module for detecting an electric parameter value of the load, and
    a first control module for receiving the electric parameter value;
    wherein the power supply unit comprises:
    a second control module receiving the electric parameter value and providing a first frequency, a second frequency and a frequency difference; and
    a power switching module;
    wherein the second control module is configured to calculate an accumulated difference value based on the electric parameter value and the target electric parameter value, the second control module is configured to switch the power switching module at the first frequency with times of a first count and to switch the power switching module at the second frequency with times of a second count;
    wherein when the accumulated difference value is larger than an adjustment upper bound, the second control module is configured to use the second frequency as a new first frequency and to use the second frequency subtracting the frequency difference as a new second frequency; when the accumulated difference value is smaller than an adjustment lower bound, the second control module is configured to use the first frequency as the new second frequency and to use the first frequency plus the frequency difference as the new first frequency; whereby the electric parameter value is adjusted to the target electric parameter value.

2. The charging apparatus in claim 1, wherein the first control module is configured to digitalize the electric parameter value in to a digital electric parameter value, the second control module provides a digital target electric parameter value by digitalizing the target electric parameter value;

wherein the second control module comprises:
    an operation unit configured to receive the target electric parameter value and the electric parameter value and to perform calculation on the target electric parameter value and the electric parameter value to generate an electric parameter difference value; and
    an accumulator receiving the electric parameter difference value and accumulating the electric parameter difference value to provide the accumulated difference value with P bits.

3. The charging apparatus in claim 2, wherein the second control module is configured to fetch M most significant bits from the P bits data to form an M bit data, and to adjust the first count and the second count based on the M bit data, wherein a sum of the first count and the second count is equal to a maximal value represented by the M bit data.

4. The charging apparatus in claim 3, wherein the second control module is configured to determine that the accumulated difference value is larger than the adjustment upper bound when the digital target electric parameter value is larger than the digital electric parameter value and the M bit data has carry operation.

5. The charging apparatus in claim 3, wherein the second control module is configured to determine that the accumulated difference value is smaller than the adjustment lower bound when the digital target electric parameter value is smaller than the digital electric parameter value and the M bit data has borrow operation.

6. The charging apparatus in claim 3, wherein the second count is equal to a decimal value corresponding to the M bit data.

7. The charging apparatus in claim 1, further comprising:
    a communication module receiving the electric parameter value provided by the first control module and sending the electric parameter value to the second control module.

8. The charging apparatus in claim 1, wherein the power supply unit further comprises:
    a touch-control switch coupled to the second control module, the touch-control switch is configured to trigger the second control module to control the power switching module when the touch-control switch receives a touch signal.

9. The charging apparatus in claim 7, further comprising:
    an inductance coupling unit coupled between the power supply unit and the power requirement unit and sending an electric power of the power supply unit to the power requirement unit;
    wherein the communication module has Bluetooth communication function to provide wireless communication between the first control module and the second control module.

10. The charging apparatus in claim 7, further comprising:
    a power conversion unit electrically connected between the power supply unit and the power requirement unit and sending an electric power of the power supply unit to the power requirement unit;
    wherein the communication module provides wired communication between the first control module and the second control module.

* * * * *